United States Patent
Muramoto et al.

(10) Patent No.: US 9,379,845 B2
(45) Date of Patent: *Jun. 28, 2016

(54) TRANSMISSION DEVICE, RECEPTION DEVICE, TRANSMISSION METHOD, AND RECEPTION METHOD

(71) Applicant: Panasonic Intellectual Property Management Co., Ltd., Osaka (JP)

(72) Inventors: Eiichi Muramoto, Kanagawa (JP); Takahiro Yoneda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 50 days.

This patent is subject to a terminal disclaimer.

(21) Appl. No.: 14/403,088

(22) PCT Filed: May 20, 2013

(86) PCT No.: PCT/JP2013/003174
§ 371 (c)(1),
(2) Date: Nov. 21, 2014

(87) PCT Pub. No.: WO2013/183235
PCT Pub. Date: Dec. 12, 2013

(65) Prior Publication Data
US 2015/0143204 A1    May 21, 2015

(30) Foreign Application Priority Data

Jun. 4, 2012  (JP) ................................. 2012-127319

(51) Int. Cl.
*H04L 1/00* (2006.01)
*H04L 29/06* (2006.01)
*H04L 1/18* (2006.01)

(52) U.S. Cl.
CPC .............. *H04L 1/0041* (2013.01); *H04L 1/007* (2013.01); *H04L 1/0009* (2013.01);

(Continued)

(58) Field of Classification Search
CPC ....................................................... H04L 1/0057
USPC .................................. 714/776, 748, 488, 724
See application file for complete search history.

(56) References Cited

U.S. PATENT DOCUMENTS 5,357,425 A * 10/1994 Minto ...................... G05B 9/03
                                                          700/73
6,301,248 B1 * 10/2001 Jung .................... H04L 12/2801
                                                          370/392

(Continued)

FOREIGN PATENT DOCUMENTS

| JP | 9-191314 A | 7/1997 |
| JP | 11-177945 A | 7/1999 |
| JP | 11-331108 A | 11/1999 |
| JP | 2003-92564 A | 3/2003 |

(Continued)

OTHER PUBLICATIONS

International Search Report, mailed Aug. 20, 2013, for International Application No. PCT/JP2013/003174, 4 pages.

*Primary Examiner* — Fritz Alphonse
(74) *Attorney, Agent, or Firm* — Seed IP Law Group PLLC

(57) ABSTRACT

A transmission device for rigorously protecting important information when information is transferred via a best-effort network. In this transmission device, a quality control information retention unit (203) holds quality control information set by a user. A recovery strength instruction unit (204) sets redundant code strength on the basis of transmission quality information from a reception device (104) and the quality control information held by means of the quality control information retention unit (203). Redundant encoding units (205, 206) generate, on the basis of the redundant code strength outputted from the recovery strength instruction unit (204), redundant code packets by means of an FEC for the packets outputted from encoding units (201, 202).

7 Claims, 14 Drawing Sheets

(52) U.S. Cl.
CPC .......... *H04L 1/1874* (2013.01); *H04L 1/1887* (2013.01); *H04L 65/403* (2013.01); *H04L 65/608* (2013.01); *H04L 65/80* (2013.01)

(56) References Cited

U.S. PATENT DOCUMENTS

| | | |
|---|---|---|
| 2003/0005386 A1 | 1/2003 | Bhatt et al. |
| 2006/0150053 A1 | 7/2006 | van der Schaar et al. |
| 2008/0080369 A1 | 4/2008 | Sumioka et al. |
| 2012/0039194 A1 | 2/2012 | Kure et al. |

FOREIGN PATENT DOCUMENTS

| | | |
|---|---|---|
| JP | 2006-510301 A | 3/2006 |
| JP | 2007-267176 A | 10/2007 |
| JP | 2008-92116 A | 4/2008 |
| JP | 2009-212842 A | 9/2009 |
| JP | 2010-119133 A | 5/2010 |
| JP | 2012-44252 A | 3/2012 |

* cited by examiner

|  | SYNCHRONIZATION PARAMETER | PROTECTION STRENGTH |
|---|---|---|
| SPEAKER SOUND | 0 = REFERENCE | 8 = STRONG |
| SPEAKER IMAGE | 10ms | 2 = WEAK |
| DOCUMENT IMAGE | 200ms | 10 = STRONGEST |

*FIG. 3*

| PLR[i] PACKET LOSS RATE | PROVISIONAL FEC STRENGTH |
|---|---|
| LESS THAN 0.5% | FEC:50% |
| 0.5% OR ABOVE AND BELOW 10% | FEC:100% |
| 10% OR ABOVE | FEC:200% |

FIG. 7

|   | 50 | 100 | 200 |
|---|---|---|---|
| 1 | VFEC | VFEC | VFEC |
| 2 | VFEC | VFEC | VFEC |
| 3 | VFEC | VFEC | LVFEC |
| 4 | VFEC | VFEC | LVFEC |
| 5 | VFEC | VFEC | LVFEC |
| 6 | VFEC | LVFEC | LVFEC |

FIG. 8

|   | 50 | 100 | 200 |
|---|----|-----|-----|
| 1 | 1  | 1   | 1   |
| 2 | 1  | 1   | 1   |
| 3 | 1  | 1   | 2   |
| 4 | 1  | 1   | 2   |
| 5 | 2  | 1   | 3   |
| 6 | 2  | 3   | 3   |

FIG. 9

|   | 50 | 100 | 200 |
|---|----|-----|-----|
| 1 | 1  | 1   | 1   |
| 2 | 2  | 1   | 1   |
| 3 | 3  | 1   | 2   |
| 4 | 4  | 1   | 2   |
| 5 | 3  | 1   | 1   |
| 6 | 3  | 2   | 1   |

FIG. 10

| | REDUNDANCY CODE STRENGTH | RETRANSMISSION UPPER LIMIT COUNT | PROTECTION EFFECT |
|---|---|---|---|
| 701 — SPEAKER SOUND | FEC=50% | 0 TIMES | LESS DISTURBED |
| 702 — SPEAKER IMAGE | FEC=0% | 0 TIMES | EASILY DISTURBED |
| 703 — DOCUMENT IMAGE | FEC=50% | 2 TIMES | COMPLETELY UNDISTURBED |

FIG. 12

|  | SYNCHRONIZATION PARAMETER Syt | PROTECTION STRENGTH St |
|---|---|---|
| DIVIDED SCREENS | 0 = REFERENCE | 2 = WEAK |
| Mix SOUND | 10ms | 5 |
| SOCCER IMAGE | 200ms | 10 = STRONGEST |
| SOCCER SOUND | 200ms | 10 = STRONGEST |

*FIG. 16*

|  |  | 1205 REDUNDANCY CODE STRENGTH | 1206 RETRANSMISSION UPPER LIMIT COUNT | 1207 PROTECTION EFFECT |
|---|---|---|---|---|
| 1201 | DIVIDED SCREENS | FEC=0% | 0 TIMES | DISTURBED |
| 1202 | Mix SOUND | FEC=50% | 1 TIME | ALMOST UNDISTURBED |
| 1203 | SOCCER IMAGE | FEC=50% | 2 TIMES | COMPLETELY UNDISTURBED |
| 1204 | SOCCER SOUND | FEC=50% | 2 TIMES | COMPLETELY UNDISTURBED |

*FIG. 17*

TRANSMISSION DEVICE, RECEPTION DEVICE, TRANSMISSION METHOD, AND RECEPTION METHOD

TECHNICAL FIELD

The present application relates to a transmitting apparatus, a receiving apparatus, a transmission method and a reception method that multiplex and transmit a plurality of real-time streams such as video, sound via a best-effort network such as the Internet.

BACKGROUND ART

In recent years, systems for television conference or the like are becoming widespread which transmit/receive a plurality of real-time streams such as video, sound among terminal apparatuses via a best-effort network such as the Internet.

In a best-effort network, available bands change as an environment changes, and it is therefore necessary to dynamically change the amount of code of each real-time stream. PTL 1 discloses a scheme in which a large code amount is assigned to more complicated real-time streams.

In the best-effort network, when an environment deteriorates, packet losses occur. For this reason, the best-effort network employs a scheme in which lost packets are recovered using a redundancy code packet generated by FEC (Forward Error Correction) or retransmission of packets. When FEC is used, the greater code amount is assigned, the more redundancy code packets can be generated, and it is thereby possible to increase recovery strength of packets.

CITATION LIST

Patent Literature

PTL 1
Japanese Patent Application Laid-Open No. H11-177945

SUMMARY OF INVENTION

Technical Problem

Users have a desire to increase recovery strength of packets for more important real-time streams.

However, according to the technique in PTL 1, a code amount of each real-time stream is assigned regardless of the users' intention, which may result in cases where real-time streams important to the users are not fully protected.

An object of the present invention is to strongly protect important information when information is transmitted via a best-effort network such as the Internet.

Solution to Problem

A transmitting apparatus according to an aspect of the present invention is a transmitting apparatus that multiplexes and transmits a plurality of real-time streams to a receiving apparatus via a network where a packet loss occurs, the transmitting apparatus including: a quality control information storage section that stores quality control information set by a user for controlling transmission quality of each real-time stream; a recovery strength indicating section that sets redundancy code strength for each of the plurality of real-time streams in accordance with transmission quality information indicating a situation of the network and the quality control information; and a redundant coding section that determines a redundant code amount of each of the real-time streams based on the redundancy code strength, and that generates a redundancy code packet.

A transmission method according to an aspect of the present invention is a method for a transmitting apparatus that multiplexes and transmits a plurality of real-time streams to a receiving apparatus via a network where a packet loss occurs, the method including: storing quality control information set by a user for controlling transmission quality of each real-time stream; setting redundancy code strength for each of the plurality of real-time streams in accordance with transmission quality information indicating a situation of the network and the quality control information; and determining a redundant code amount of each of the real-time streams based on the redundancy code strength, and generating a redundancy code packet.

Advantageous Effects of Invention

The present invention can protect important information even when a network situation deteriorates in limited resources (bands).

BRIEF DESCRIPTION OF DRAWINGS

FIG. 3 illustrates an example of information stored in a quality control information storage section of the transmitting apparatus according to Embodiment 1 of the present invention;

FIG. 7 illustrates an example of a relationship between a packet loss rate and provisional FEC strength;

FIG. 8 illustrates an example of a relationship between a data amount, provisional FEC strength and a direction in which a redundancy code packet is generated;

FIG. 9 illustrates an example of a relationship between a data amount, provisional FEC strength and a size in a lateral direction;

FIG. 10 illustrates an example of a relationship between a data amount, provisional FEC strength and a size in a vertical direction;

FIG. 12 illustrates effects of Embodiment 1 of the present invention;

FIG. 16 illustrates an example of information stored in a quality control information storage section of the transmitting apparatus according to Embodiment 3 of the present invention; and FIG. 17 illustrates effects of Embodiment 3 of the present invention.

DESCRIPTION OF EMBODIMENTS

Hereinafter, embodiments of the present invention will be described in detail with reference to the accompanying drawings.

Embodiment 1

System Configuration

Figure 1:
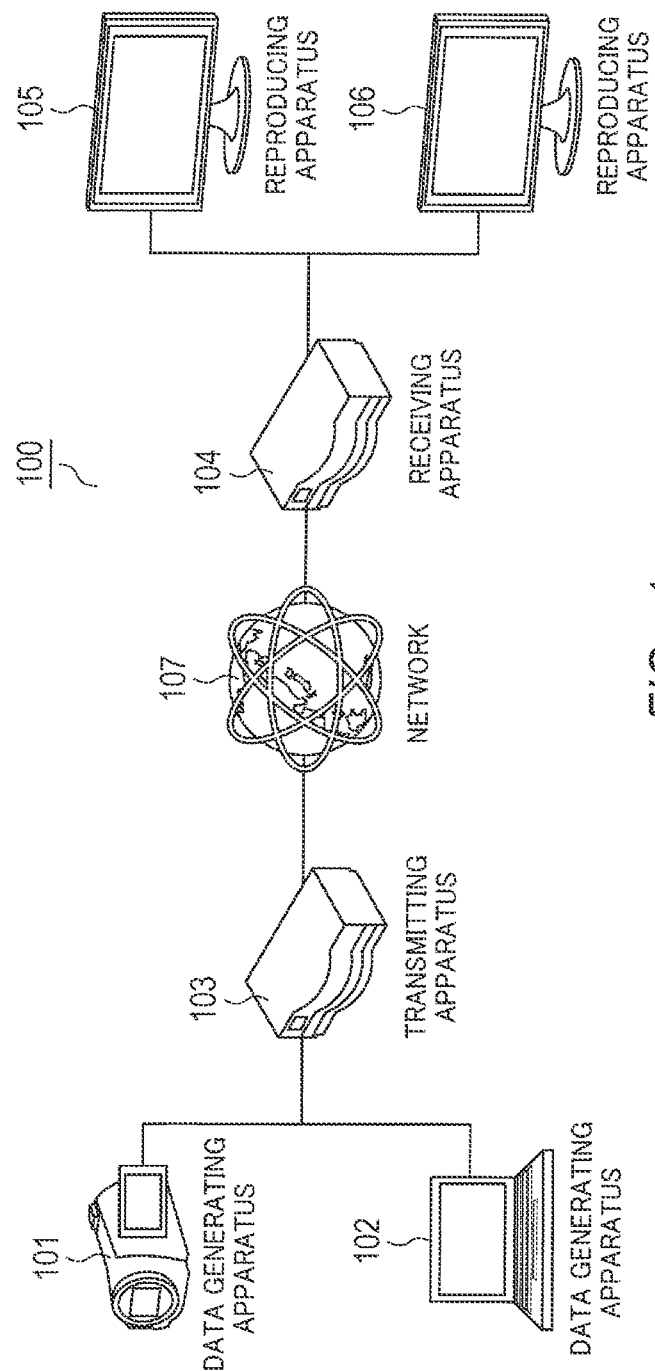
FIG. 1 illustrates an example of a configuration of a communication system according to Embodiment 1 of the present invention.

FIG. 1 illustrates an example of a configuration of a communication system according to Embodiment 1 of the present invention. Communication system 100 shown in FIG. 1 is a system that can simultaneously transmit/receive two independent images through dual streaming.

As shown in FIG. 1, communication system 100 is mainly constructed of data generating apparatuses 101 and 102, transmitting apparatus 103, receiving apparatus 104, reproducing apparatuses 105 and 106, and network 107.

Data generating apparatus 101 converts an image of a speaker picked up by a camera or sound of the speaker collected by a microphone to data, and outputs a real-time stream of the image or sound data to transmitting apparatus 103. Data generating apparatus 102 outputs the real-time stream of document image data stored in a memory to transmitting apparatus 103.

Transmitting apparatus 103 encodes the real-time streams outputted from data generating apparatuses 101 and 102, configures packets and transmits the packets to receiving apparatus 104 via network 107. At a request from receiving apparatus 104, transmitting apparatus 103 retransmits the packets.

Receiving apparatus 104 decodes the packets received from transmitting apparatus 103 and outputs the real-time streams of the image and sound to reproducing apparatuses 105 and 106 respectively. Receiving apparatus 104 transmits transmission quality information to transmitting apparatus 103 via network 107. The transmission quality information refers to information indicating a situation of the network and is information relating to a packet loss rate or transmission delay of the real-time stream received by receiving apparatus 104. The information relating to the packet loss rate or transmission delay may also be information on the packet loss rate or jitter defined in the receiver report (RR) of RFC3550. The information relating to the packet loss rate or transmission delay may also be statistical information on the packet loss rate or transmission delay compiled by receiving apparatus 104 for a specific statistical period. The information relating to a transmission delay may be information on a unidirectional transmission delay in transmission of a packet in a direction from transmitting apparatus 103 to receiving apparatus 104 or information on a round-trip delay time between transmitting apparatus 103 and receiving apparatus 104. That is, the information relating to a transmission delay may be a maximum value, minimum value, average value or variance of unidirectional transmission delays or corresponding statistical information of round-trip delays.

Reproducing apparatuses 105 and 106 reproduce images and sound based on the real-time streams of the images and sound inputted from receiving apparatus 104.

Note that in communication system 100, packet losses may occur in network 107. In such communication system 100, if a real-time stream in which a packet loss has occurred is not recovered in receiving apparatus 104, decoded and reproduced in reproducing apparatuses 105 and 106, image disorder or sound skipping may result. Thus, the present embodiment introduces a function of avoiding image disorder or sound skipping due to packet losses to transmitting apparatus 103 and receiving apparatus 104.

<Configuration of Transmitting Apparatus>

Figure 2:
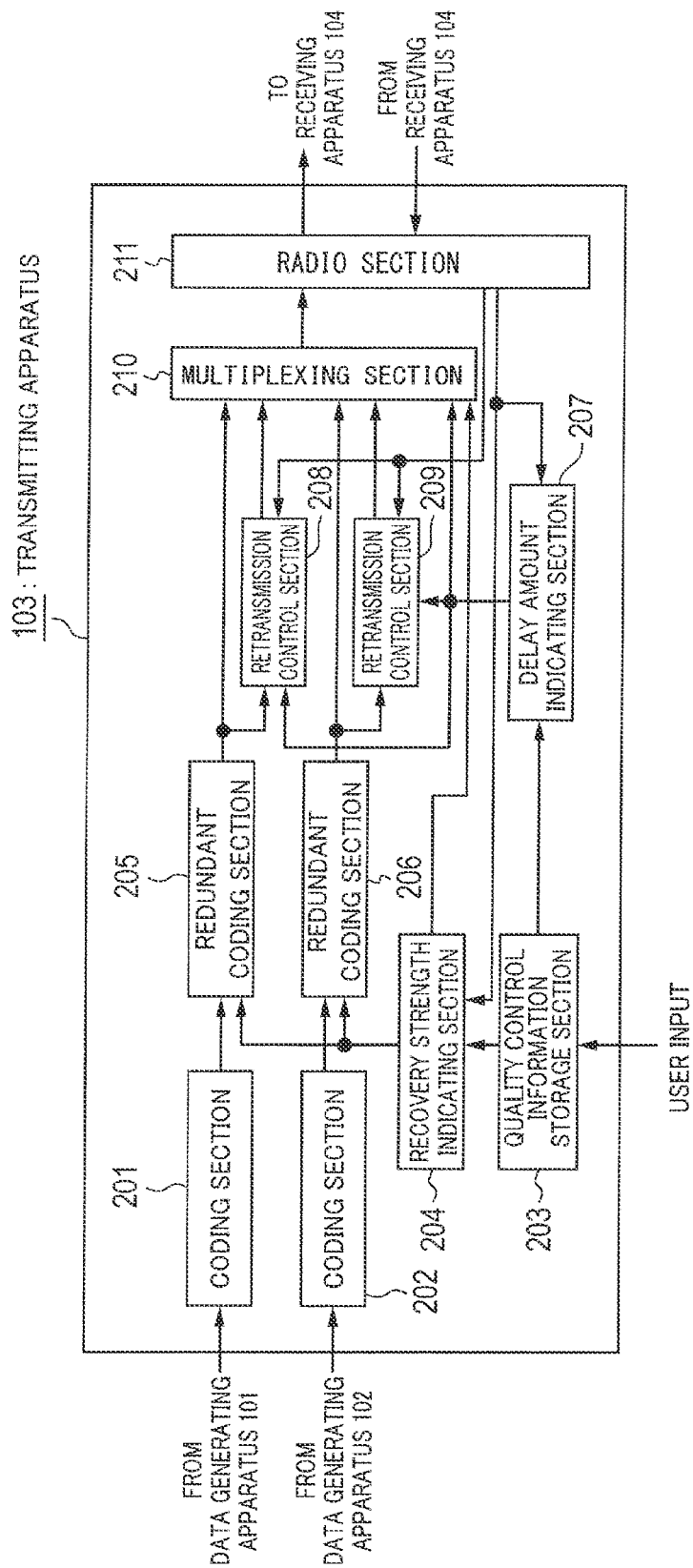
FIG. 2 is a block diagram illustrating a configuration of a transmitting apparatus according to Embodiment 1 of the present invention.

FIG. 2 is a block diagram illustrating a configuration of transmitting apparatus 103 according to the present embodiment. Transmitting apparatus 103 is mainly constructed of coding sections 201 and 202, quality control information storage section 203, recovery strength indicating section 204, redundant coding sections 205 and 206, delay amount indicating section 207, retransmission control sections 208 and 209, multiplexing section 210, and radio section 211.

Coding section 201 encodes a real-time stream of image and/or sound data outputted from data generating apparatus 101 and outputs a packet of the coded real-time stream to redundant coding section 205. On the other hand, coding section 202 encodes a real-time stream of document image data outputted from data generating apparatus 102 and outputs a packet of the coded real-time stream to redundant coding section 206. An encoding scheme of image data is, for example, H.264 or MPEG4. An encoding scheme of sound data is, for example, AAC or G.722.

Quality control information storage section 203 stores information on control of transmission quality of each real-time stream set by a user (hereinafter, referred to as "quality control information"). FIG. 3 illustrates an example of the quality control information. The quality control information is, for example, a synchronization parameter indicating an allowable range of delay time of a real-time stream with respect to a reference real-time stream (real-time stream of sound of a speaker) and protection strength indicating strength of protection of each real-time stream.

Recovery strength indicating section 204 sets redundancy code strength based on transmission quality information from receiving apparatus 104 and quality control information stored in quality control information storage section 203. Recovery strength indicating section 204 then outputs the redundancy code strength to redundant coding sections 205 and 206, and multiplexing section 210. Details of the control conducted by recovery strength indicating section 204 will be described later.

Redundant coding sections 205 and 206 each generate a redundancy code packet on the packets outputted from coding sections 201 and 202 based on the redundancy code strength outputted from recovery strength indicating section 204 using FEC. Redundant coding sections 205 and 206 output the packets and redundancy code packets outputted from coding sections 201 and 202 to retransmission control sections 208 and 209, and multiplexing section 210 respectively. An example of generation of redundancy code packet conducted by redundant coding sections 205 and 206 will be described later.

Delay amount indicating section 207 determines an upper limit retransmission count of a packet of each real-time stream based on the transmission quality information from receiving apparatus 104 and the quality control information stored in quality control information storage section 203. Delay amount indicating section 207 then outputs the retransmission upper limit count to retransmission control sections 208 and 209, and multiplexing section 210. Details of the control conducted by delay amount indicating section 207 will be described later.

Retransmission control sections 208 and 209 store packets for a predetermined period according to the retransmission upper limit count determined by delay amount indicating section 207 and outputs the retransmission packet to multiplexing section 210 at a request for retransmission from receiving apparatus 104.

Multiplexing section 210 receives the packets outputted from redundant coding sections 205 and 206 or the retransmission packets outputted from retransmission control sections 208 and 209 as input. Multiplexing section 210 further receives the redundancy code strength outputted from recovery strength indicating section 204 and the retransmission upper limit count outputted from delay amount indicating section 207 as input. Multiplexing section 210 then multiplexes the inputted packets or retransmission packets, redundancy code strength and retransmission upper limit count and outputs the multiplexed data to radio section 211.

Radio section 211 performs radio processing such as up-conversion, amplification on the data outputted from multiplexing section 210 and transmits a radio signal to receiving apparatus 104 via network 107. Radio section 211 also performs radio processing such as down-conversion, amplification on a radio signal received from receiving apparatus 104. Radio section 211 outputs the received transmission quality information to recovery strength indicating section 204 and delay amount indicating section 207, and outputs a retransmission request to retransmission control sections 208 and 209.

<Configuration of Receiving Apparatus>

Figure 4:
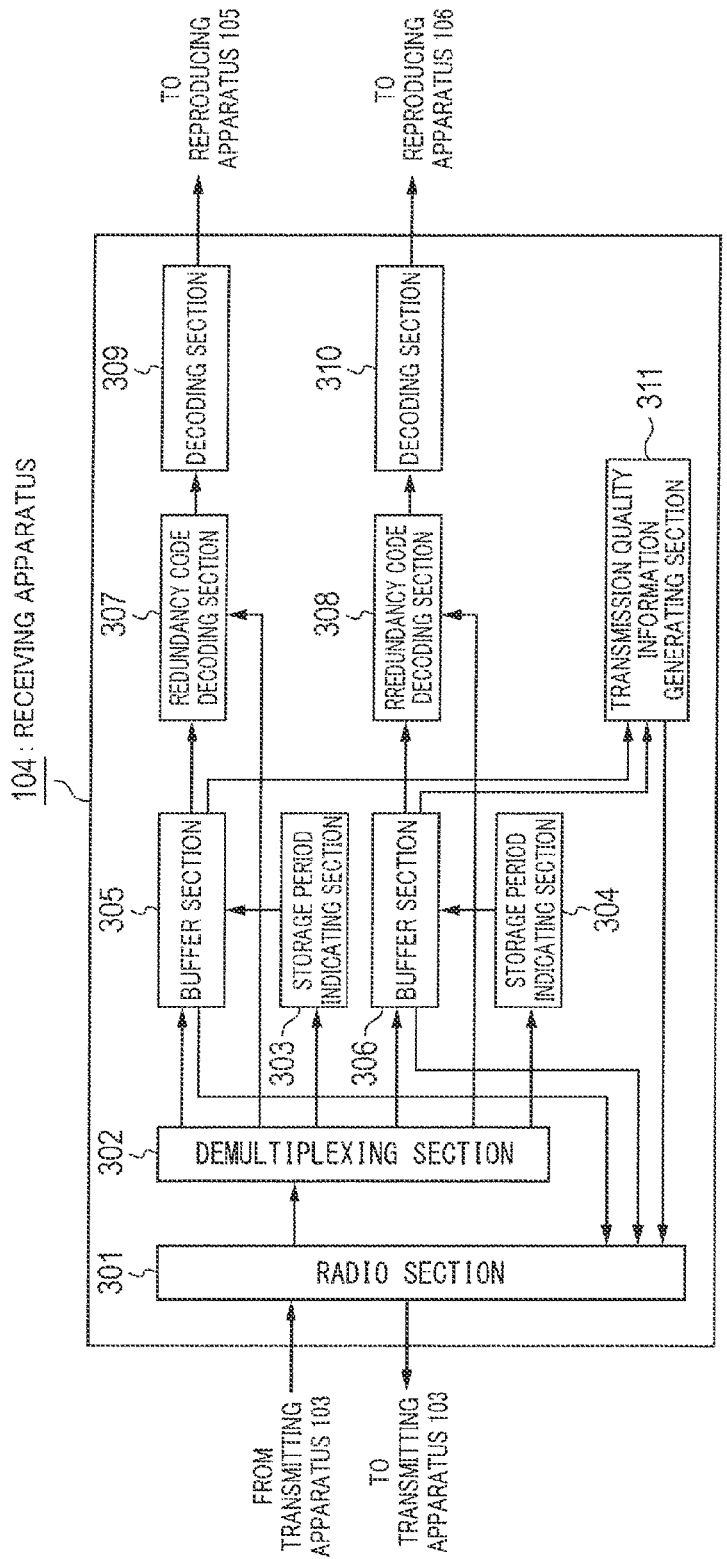
FIG. 4 is a block diagram illustrating a configuration of a receiving apparatus according to Embodiment 1 of the present invention.

FIG. 4 is a block diagram illustrating a configuration of receiving apparatus 104 according to the present embodiment. Receiving apparatus 104 is mainly constructed of radio section 301, demultiplexing section 302, storage period indicating sections 303 and 304, buffer sections 305 and 306, redundancy code decoding sections 307 and 308, decoding sections 309 and 310, and transmission quality information generating section 311.

Radio section 301 performs radio processing such as down-conversion, amplification on a radio signal received from transmitting apparatus 103 and outputs a baseband signal to demultiplexing section 302. In addition, radio section 301 performs radio processing such as up-conversion, amplification on a retransmission request outputted from buffer sections 305 and 306, and transmission quality information outputted from transmission quality information generating section 311. Radio section 301 transmits the radio signal subjected to radio processing to transmitting apparatus 103 via network 107.

Demultiplexing section 302 demultiplexes the signal outputted from radio section 301, outputs a packet to buffer sections 305 and 306, outputs a retransmission upper limit count to storage period indicating sections 303 and 304, and outputs redundancy code strength to redundancy code decoding sections 307 and 308.

Storage period indicating sections 303 and 304 indicate times for storing packets to buffer sections 305 and 306 respectively based on the retransmission upper limit count transmitted from transmitting apparatus 103.

Buffer sections 305 and 306 store the times indicated by storage period indicating sections 303 and 304, and packets of real-time streams transmitted from transmitting apparatus 103. When a packet loss occurs, buffer sections 305 and 306 transmit a retransmission request to transmitting apparatus 103 via radio section 301 until a retransmission upper limit count.

Redundancy code decoding sections 307 and 308 store as many packets of real-time streams as FEC blocks in accordance with redundancy code strength transmitted from transmitting apparatus 103. Redundancy code decoding sections 307 and 308 perform processing of recovering packets lost in network 107 using redundancy code packets respectively and output the recovered real-time streams to decoding sections 309 and 310.

Decoding sections 309 and 310 decode the real-time streams and output the decoded real-time streams to reproducing apparatuses 105 and 106 respectively.

Transmission quality information generating section 311 generates transmission quality information which is information relating to a packet loss rate or transmission delay of the real-time streams received by buffer sections 305 and 306, and outputs the transmission quality information to radio section 301.

<Example of Generation of Redundancy Code Packet>

Next, an example of a redundancy code packet generated by redundant coding sections 205 and 206 will be described using FIG. 5.

Figure 5:
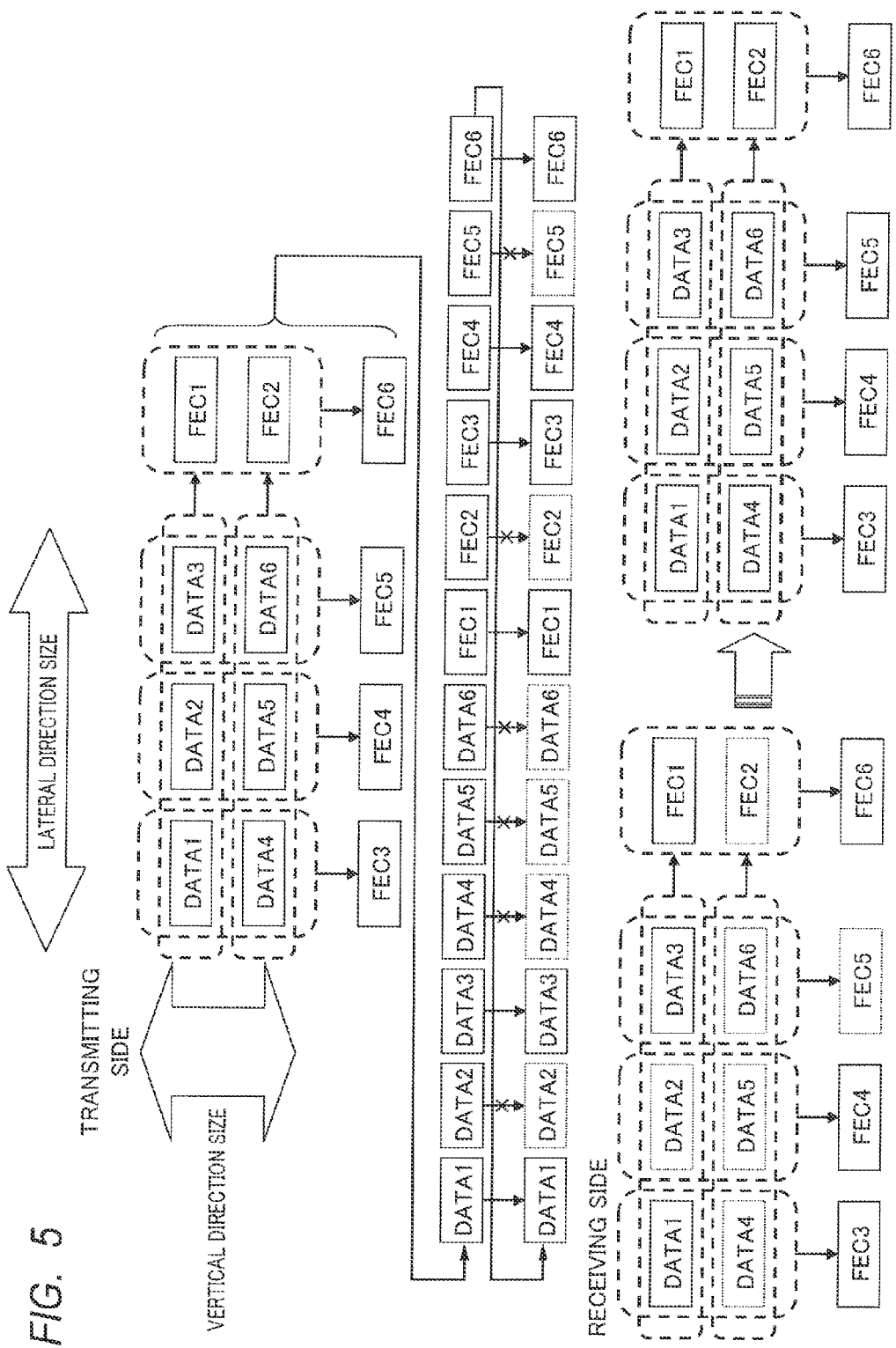
FIG. 5 illustrates an example of generation of a redundancy code packet according to Embodiment 1 of the present invention.

FIG. 5 illustrates an example where redundancy code packets are generated in both directions of the vertical direction and lateral direction. In this example, six redundancy code packets of FEC1 to FEC6 are generated for an FEC block made up of six data packets of DATA1 to DATA6, two in the vertical direction and three in the lateral direction (FEC: 100%).

In this case, transmitting apparatus 103 transmits 12 packets of DATA1 to DATA6 and FEC1 to FEC6.

FIG. 5 illustrates a case where six packets of DATA2, DATA4, DATA5, DATA6, FEC2, and FEC5 are lost in a communication channel.

In this case, redundancy code decoding sections 307 and 308 of receiving apparatus 104 perform processing of recovering the lost packets using the received packets. More specifically, redundancy code decoding sections 307 and 308 recover DATA2 using DATA1, DATA3 and FEC1, and recover FEC5 using FEC3, FEC4 and FEC6 respectively. In addition, redundancy code decoding sections 307 and 308 recover DATA4 using DATA1 and FEC3, DATA5 using DATA2 and FEC4, DATA6 using DATA3 and FEC5, and FEC2 using FEC1 and FEC6 respectively.

<Example of Calculating Redundancy Code Strength>

Figure 6:
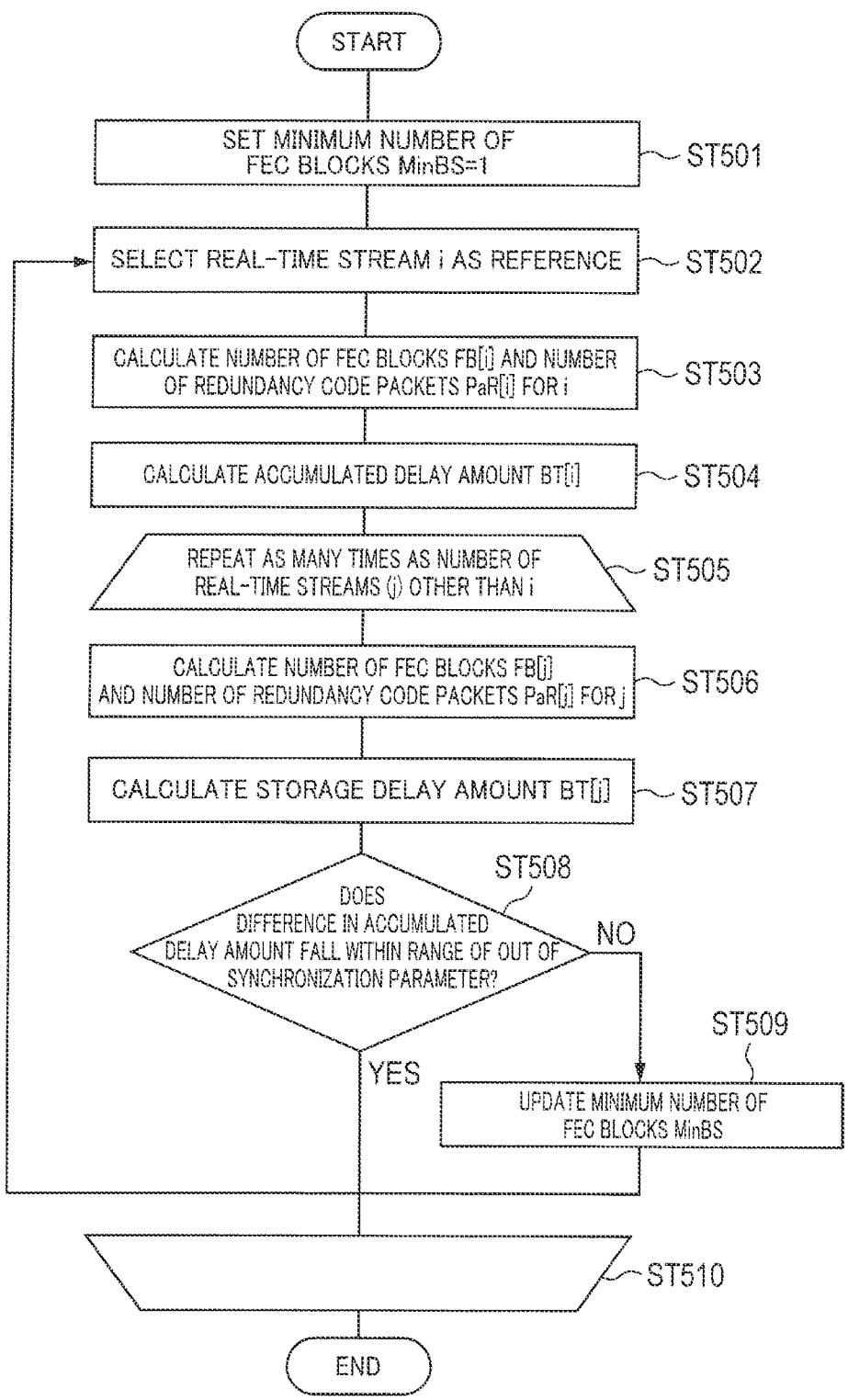
FIG. 6 is a flowchart illustrating a calculation flow of redundancy code strength according to Embodiment 1 of the present invention.

Next, details of operation of recovery strength indicating section 204 of transmitting apparatus 103 will be described with reference to FIG. 6. FIG. 6 is a flowchart illustrating a calculation flow of redundancy code strength in recovery strength indicating section 204.

Recovery strength indicating section 204 first determines an initial value of the minimum number of FEC blocks MinFB. For example, the initial value of the minimum number of FEC blocks MinFB may be set to "1" (step ST501).

Next, recovery strength indicating section 204 selects a real-time stream (assumed to be i) as a reference (step ST502). An example of a method of selecting a real-time stream as a reference is a method that selects a synchronization parameter having a value of 0 of quality control information storage section 203.

Next, recovery strength indicating section 204 determines the number of FEC blocks of real-time stream i as a reference FB[i] and the number of redundancy code packets PaR[i] (step ST503). More specifically, the number of FEC blocks of real-time stream i FB[i] and the number of redundancy code packets PaR[i] are determined from packet loss rate PLR[i], data amount of the processing unit for performing redundant coding D[i] and protection strength of quality control information ST[i]. Here, in the case of, for example, an image stream, data amount D[i] is a data amount of a packet making up one picture or a data amount that falls within a specific processing unit of a device. In a case where sound packets are transmitted at 10-ms intervals using an apparatus that operates in 20-ms units, data amount D[i] becomes a data amount corresponding to 2 packets.

Next, a more specific calculation procedure in step ST503 will be described. First, recovery strength indicating section 204 determines recovery rate ReR[i] from protection strength ST[i] according to following equation 1. Recovery strength indicating section 204 may store a table that associates protection strength ST[i] with recovery rate ReR[i] and determine recovery rate ReR[i] based on the table.

[1]

$$ReR[i] = 1 - 10^{\wedge}(-ST[i]*\alpha) \quad \text{(Equation 1)}$$

Here, "^" in equation 1 denotes a symbol representing power and "α" denotes a positive constant. For example, in the case of ST[i]=2, α=1, recovery rate ReR[i]=1−10^(−2*1)=0.99, that is, recovery rate ReR[i] is 99%.

Recovery strength indicating section 204 calculates the number of redundancy code packets PaR[i] that satisfies recovery rate ReR[i] and the number of FEC blocks FB[i] from packet loss rate PLR[i] and data amount D[i] obtained by a simulation.

More specifically, recovery strength indicating section 204 calculates the size in the vertical direction and the size in the lateral direction of an FEC block using tables in FIG. 7, FIG. 8, FIG. 9 and FIG. 10.

First, recovery strength indicating section 204 calculates provisional FEC strength from packet loss rate PLR[i] using FIG. 7.

Next, recovery strength indicating section 204 determines the direction in which a redundancy code packet is generated using FIG. 8. In FIG. 8, VFEC represents only the vertical direction, LFEC represents only the lateral direction and LVFEC represents both the vertical direction and lateral direction.

Next, recovery strength indicating section 204 acquires information on the sizes of FBx[i] and FBy[i] in the lateral direction and vertical direction using FIG. 9 and FIG. 10 respectively. In FIG. 8, FIG. 9 and FIG. 10, the Y-axis represents data amount D[i] and the X-axis represents provisional FEC strength. For example, when data amount D[i] is "6" and provisional FEC strength is "100," lateral direction size FBx[i] is "3" from FIG. 9. Vertical direction size FBy[i] is "2" from FIG. 10.

Finally, recovery strength indicating section 204 calculates the number of FEC blocks FB[i] by multiplying lateral direction size FBx[i] by vertical direction size FBy[i]. In the aforementioned example, the number of FEC blocks FB[i] is "6."

In FIG. 8, FIG. 9 and FIG. 10, when data amount D[i] exceeds an upper limit, data amount D[i] is divided and the resultant value is applied to determine the number of redundancy code packets PaR[i] and the number of FEC blocks FB[i]. However, FEC block FB[i] is selected so as not to fall below minimum FEC block MinFB.

The upper limit of data amount D[i] may be set to a small value when low delay transmission is required and may be set to a large value when high resistance is exerted. When retransmission is possible, this table may be used after setting recovery rate ReR[i] to a small value. For example, when one-time retransmission is possible, recovery rate ReR[i] may be set to 1-10^-4 to 1-10^-2.

Next, recovery strength indicating section 204 causes packets to be accumulated in order for receiving apparatus 104 to configure an FEC block and calculates accumulated delay amount BT[i] which is the amount for causing a delay (step ST504). Accumulated delay amount BT[i] is calculated from the number of FEC blocks FB[i], real-time stream transmission rate SR[i] and packet size S[i] as accumulated delay amount BT[i]=(FB[i]*S[i])/SR[i].

Next, recovery strength indicating section 204 repeatedly executes steps ST505 to ST510 on real-time stream j other than real-time stream i as a reference.

More specifically, recovery strength indicating section 204 first calculates the number of FEC blocks FB[j] and the number of redundancy code packets PaR[j] for real-time stream j as with step ST503 (step ST506).

Next, recovery strength indicating section 204 calculates accumulated delay amount BT[j] for real-time stream j as with step ST504 (step ST507).

Next, recovery strength indicating section 204 calculates a difference (absolute value) between the accumulated delay amount BT[i] of real-time stream as a reference and accumulated delay amount BT[j] of the real-time stream. Recovery strength indicating section 204 then determines whether the calculated difference falls within a range of difference |Syt[j]-Sty[i]| of the synchronization parameter or not (step ST508). For example, in FIG. 3, a difference in the synchronization parameter between the real-time stream of sound of the speaker as a reference and the real-time stream of an image of the speaker is 10 ms. In this case, recovery strength indicating section 204 determines whether the difference between accumulated delay amount BT[i] of real-time stream i and accumulated delay amount BT[j] of real-time stream j falls within 10 ms or not.

Next, when the difference between BT[i] and BT[j] falls within the range of differences in the synchronization parameter (step ST508: YES), recovery strength indicating section 204 moves to the next processing (step ST510). On the other hand, when the difference between BT[i] and BT[j] does not fall within the range (step ST508: NO), recovery strength indicating section 204 moves to step ST509.

In step ST509, recovery strength indicating section 204 increases the minimum number of FEC blocks and moves to step ST502.

<Calculation Example of Retransmission Upper Limit Count>

Figure 11:
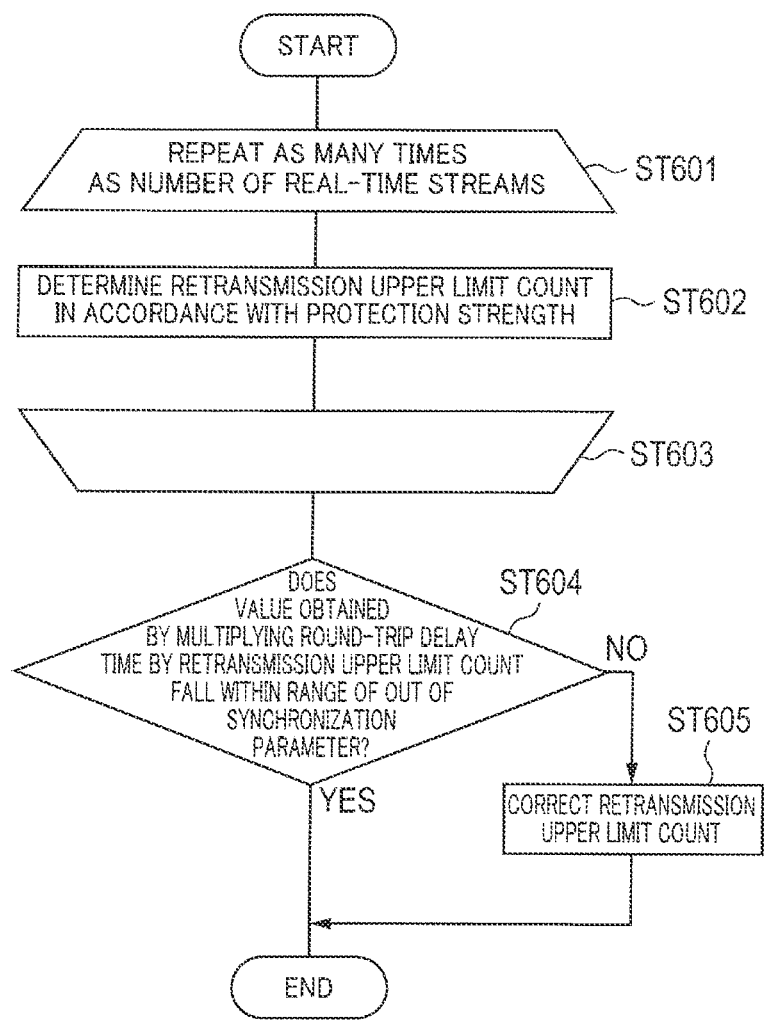
FIG. 11 is a flowchart illustrating a calculation flow of a retransmission buffer amount according to Embodiment 1 of the present invention.

Next, details of operation of delay amount indicating section 207 of transmitting apparatus 103 will be described using FIG. 11. FIG. 11 is a flowchart illustrating a calculation flow of a retransmission upper limit count in delay amount indicating section 207.

First, delay amount indicating section 207 temporarily sets a retransmission upper limit count for each real-time stream in accordance with protection strength ST[i], ST[j] of quality control information (steps ST601 to ST603). For example, in FIG. 3, since protection strength ST[j] of a real-time stream of a document image is strongest "10," delay amount indicating section 207 sets the retransmission upper limit count to 3.

Next, delay amount indicating section 207 determines whether a value obtained by multiplying round-trip delay time RTT between transmitting apparatus 103 and receiving apparatus 104 by a retransmission upper limit count falls within a range of difference |Syt[j]-Sty[i]| of a synchronization parameter or not (step ST604).

Next, when the value obtained by multiplying round-trip delay time RTT by the retransmission upper limit count falls within the range of difference in the synchronization parameter (step ST604: YES), delay amount indicating section 207 ends the processing. On the other hand, when the value does not fall within the range (step ST604: NO), delay amount indicating section 207 corrects the retransmission upper limit count and ends the processing (step ST605).

For example, when round-trip delay time RTT between transmitting apparatus 103 and receiving apparatus 104 is 100 ms, difference |Syt[i]-Syt[j]| in the synchronization parameter between the real-time stream as a reference and the real-time stream of a document image is 200 ms. For this reason, when round-trip delay time RTT is 100 ms, if the retransmission upper limit count is assumed to be 3, this will exceed the range of difference |Syt[j]-Sty[i]| in the synchronization parameter. Thus, delay amount indicating section 207 corrects the retransmission upper limit count of the real-time stream of the document image to 2 so that the value obtained by multiplying round-trip delay time RTT by the retransmission upper limit count falls within the range of difference in the synchronization parameter.

<Protection Effects>

FIG. 12 illustrates protection effects according to Embodiment 1 of the present invention. FIG. 12 illustrates protection effects 706 when redundancy code strength 704 and retransmission upper limit count 705 are adopted for each of real-time streams 701, 702, 703.

In the present embodiment, document image 703 is very important information for the user to understand contents of a conference. Therefore, in FIG. 3, protection strength of the real-time stream of document image 703 is set to strongest "10." A delay of 200 ms is allowed for the real-time stream of document image 703 for the real-time stream of speaker sound 702.

In the present embodiment, as shown in FIG. 12, the redundancy code strength of the real-time stream of document image 703 is set to 50% according to the information and the retransmission upper limit count is set to 2. As a result, the real-time stream of document image 703 is transmitted completely undisturbed.

In the present embodiment, speaker image 702 is not so important information to the user. However, speaker image 702 is information that needs to be transmitted in synchronization with speaker sound 701. Therefore, in FIG. 3, the protection strength of the real-time stream of speaker image 702 is set to "2" which is lower than that of document image 703. The real-time stream of speaker image 702 is allowed to have a delay of 10 ms with respect to the real-time stream of speaker sound 701.

In the present embodiment, as shown in FIG. 12, the redundancy code strength of the real-time stream of the speaker image is set to 0% and the retransmission upper limit count is set to 0 according to the information. As a result, the real-time stream of speaker image 702 is transmitted in synchronization with the real-time stream of speaker sound 701. Since the real-time stream of speaker image 702 is assigned only a small code amount and retransmission is not allowed, it is likely to be disturbed. However, with limited resources (bands), the present embodiment reduces the code amount of the real-time stream of speaker image 702 which is not important, and can thereby assign a greater code amount to other important real-time streams.

Thus, in the present embodiment, when information is transmitted via a best-effort network such as the Internet, it is possible to increase a code amount assigned to important information and increase a retransmission upper limit count of the important information. Thus, the present embodiment can strongly protect the important information. The present embodiment can also adjust a delay time while also taking into consideration the amount of out of synchronization between a plurality of real-time streams.

Quality control information storage section 203 may also set a synchronization parameter in accordance with the relatedness among real-time streams. An example of this is a case where real-time streams of camera images and real-time streams of computer screen images are inputted by switching among them. In this case, when real-time streams of camera images are inputted by switching among them, the apparatus may be operated so that a synchronization parameter with the real-time stream of sound is set closer.

Recovery strength indicating section 204 estimates an available band from transmission quality information of each real-time stream and acquires information relating to complexity of each real-time stream from coding sections 201 and 202. In this case, recovery strength indicating section 204 may determine the number of FEC blocks of each real-time stream using information relating to the available band of each real-time stream and the complexity of each real-time stream. For example, recovery strength indicating section 204 may assign more FEC blocks or more redundancy code packets to complex images using QP parameters (QP1, QP2) that determine the amount of quantization at the time of image coding.

Embodiment 2

A case has been described in Embodiment 1 above where the quality control information storage section, recovery strength indicating section and delay amount indicating section are arranged in the transmitting apparatus. Embodiment 2 will describe a case where these are arranged in the receiving apparatus.

The system configuration of the present embodiment is the same as that shown in FIG. 1 used for description of Embodiment 1. However, as shown below, the present embodiment is different from Embodiment 1 in the internal configurations of the transmitting apparatus and the receiving apparatus.

Figure 13:
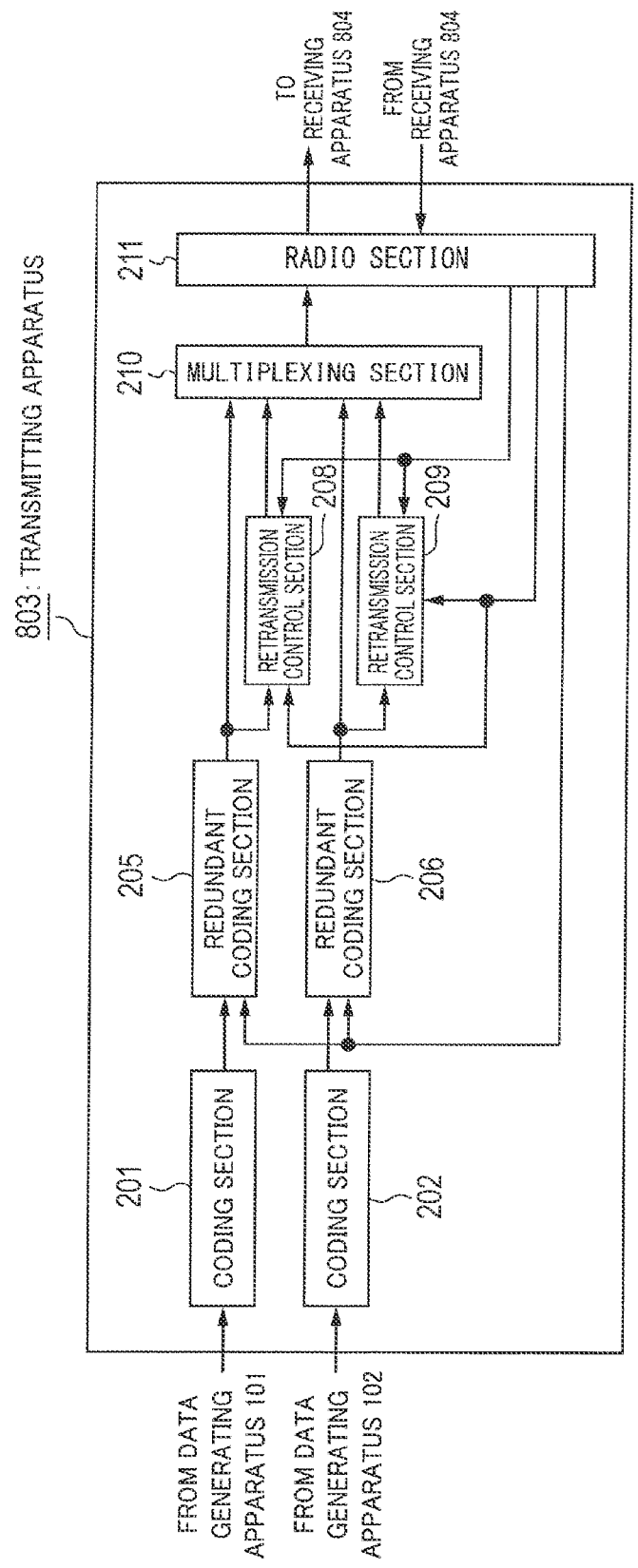
FIG. 13 is a block diagram illustrating a configuration of a transmitting apparatus according to Embodiment 2 of the present invention.

FIG. 13 is a block diagram illustrating a configuration of transmitting apparatus 803 according to the present embodiment. In FIG. 13, components common to those in FIG. 2 will be assigned the same reference numerals as those in FIG. 2 and the detailed description thereof will be omitted.

Transmitting apparatus 803 shown in FIG. 13 adopts a configuration with quality control information storage section 203, recovery strength indicating section 204 and delay amount indicating section 207 deleted from transmitting apparatus 103 shown in FIG. 2.

Redundant coding sections 205 and 206 generate redundancy code packets using FEC for packets outputted from coding sections 201 and 202 based on redundancy code strength indicated from receiving apparatus 804.

Retransmission control sections 208 and 209 store packets for a predetermined period according to a retransmission upper limit count determined by receiving apparatus 804 and output retransmission packets to multiplexing section 210 at a request for retransmission from receiving apparatus 804.

Figure 14:
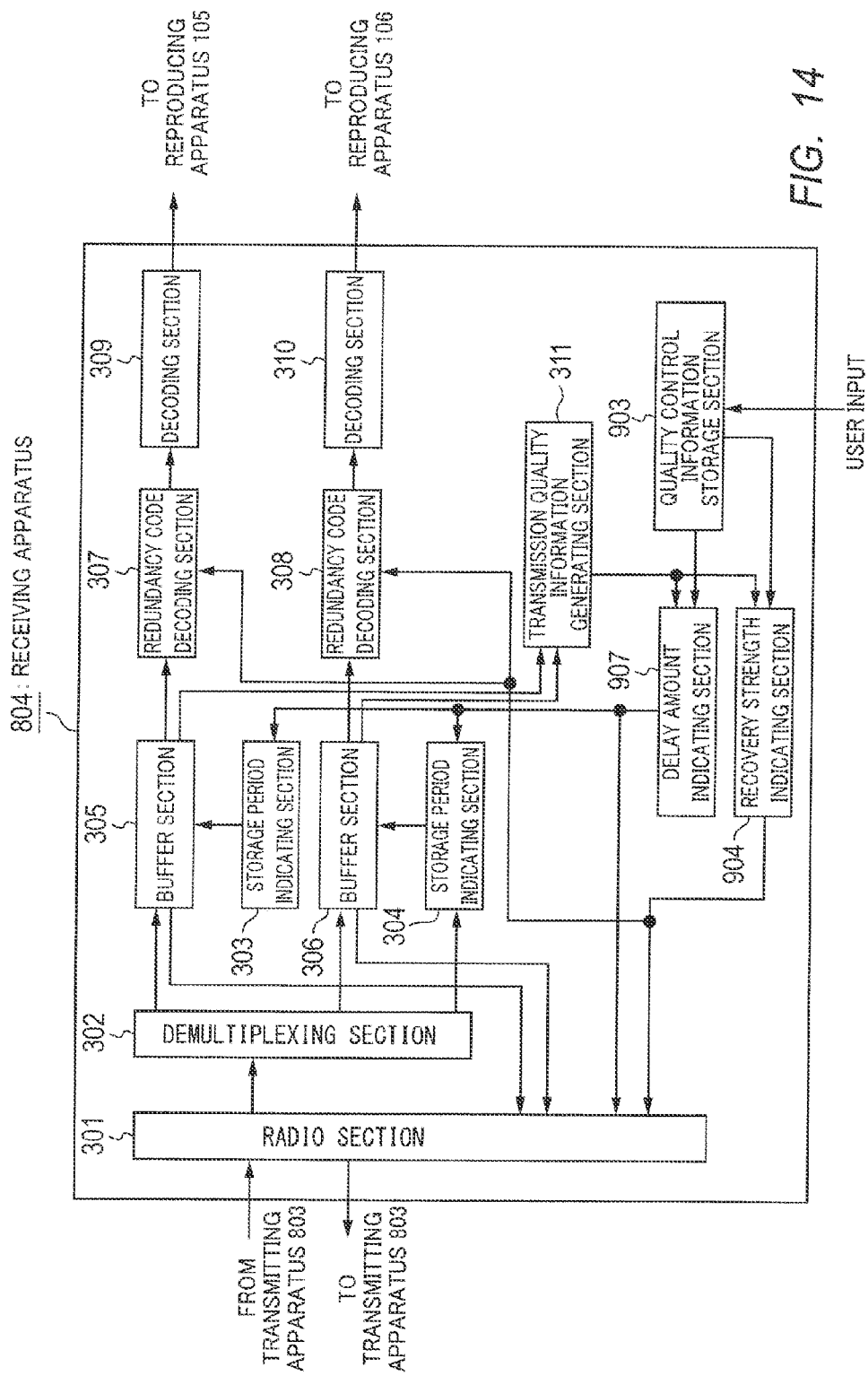
FIG. 14 is a block diagram illustrating a configuration of a receiving apparatus according to Embodiment 2 of the present invention.

FIG. 14 is a block diagram illustrating a configuration of receiving apparatus 804 according to the present embodiment. In FIG. 14, the components common to those in FIG. 4 will be assigned the same reference numerals as those in FIG. 4 and detailed description thereof will be omitted.

Receiving apparatus 804 shown in FIG. 14 adopts a configuration with quality control information storage section 903, recovery strength indicating section 904 and delay amount indicating section 907 added to receiving apparatus 104 shown in FIG. 4.

Transmission quality information generating section 311 generates transmission quality information and outputs the transmission quality information to recovery strength indicating section 904 and delay amount indicating section 907.

Quality control information storage section 903 stores quality control information set by the user.

Recovery strength indicating section 904 sets redundancy code strength based on the transmission quality information outputted from transmission quality information generating section 311 and the quality control information stored in quality control information storage section 903. Recovery strength indicating section 904 outputs the redundancy code strength to redundancy code decoding sections 307 and 308, and radio section 301.

Redundancy code decoding sections 307 and 308 store as many real-time stream packets as FEC blocks in accordance with the redundancy code strength outputted from recovery strength indicating section 904. Redundancy code decoding sections 307 and 308 perform processing of recovering packets lost in network 107 using the redundancy code packet.

Delay amount indicating section 907 determines a retransmission upper limit count of a packet of each real-time stream based on the transmission quality information outputted from transmission quality information generating section 311 and the quality control information stored in quality control information storage section 903. Delay amount indicating section 907 outputs the retransmission upper limit count to storage period indicating sections 303 and 304, and radio section 301.

Storage period indicating sections 303 and 304 indicate the storage time of a packet to buffer sections 305 and 306 based on the retransmission upper limit count outputted from delay amount indicating section 907.

Radio section 301 receives retransmission requests outputted from buffer sections 305 and 306, information indicating the redundancy code strength outputted from recovery strength indicating section 904, and the retransmission upper limit count outputted from delay amount indicating section 907 as input. Radio section 301 performs radio processing such as up-conversion, amplification on the inputted retransmission requests, information indicating redundancy code strength and retransmission upper limit count, and transmits a radio signal to transmitting apparatus 803 via network 107.

Thus, in the present embodiment, the user on the receiving apparatus side can set quality of each real-time stream. As with Embodiment 1, the present embodiment can assign a greater code amount to important real-time streams using limited resources (bands) and protect important information even when a network situation deteriorates. The present embodiment can also adjust a delay time while taking into consideration the amount of out of synchronization among a plurality of real-time streams.

The present embodiment can also arrange the recovery strength indicating section and the delay amount indicating section in the transmitting apparatus and arrange the quality control information storage section in the receiving apparatus.

The configuration requirements described in Embodiments 1 and 2 are all applicable to terminals that perform bidirectional communication. That is, in Embodiments 1 and 2, it is possible to introduce configuration requirements of the transmitting apparatus and configuration requirements of the receiving apparatus to the respective terminals and adjust a delay time while taking into consideration the amount of out of synchronization for transmissions of a plurality of real-time streams of both apparatuses. In this case, Embodiments 1 and 2 adopt a mode in which the transmitting apparatus of Embodiment 1 and the receiving apparatus of Embodiment 2 are introduced to one terminal, and can thereby arrange the quality control information storage section in one terminal.

Embodiment 3

Figure 15:
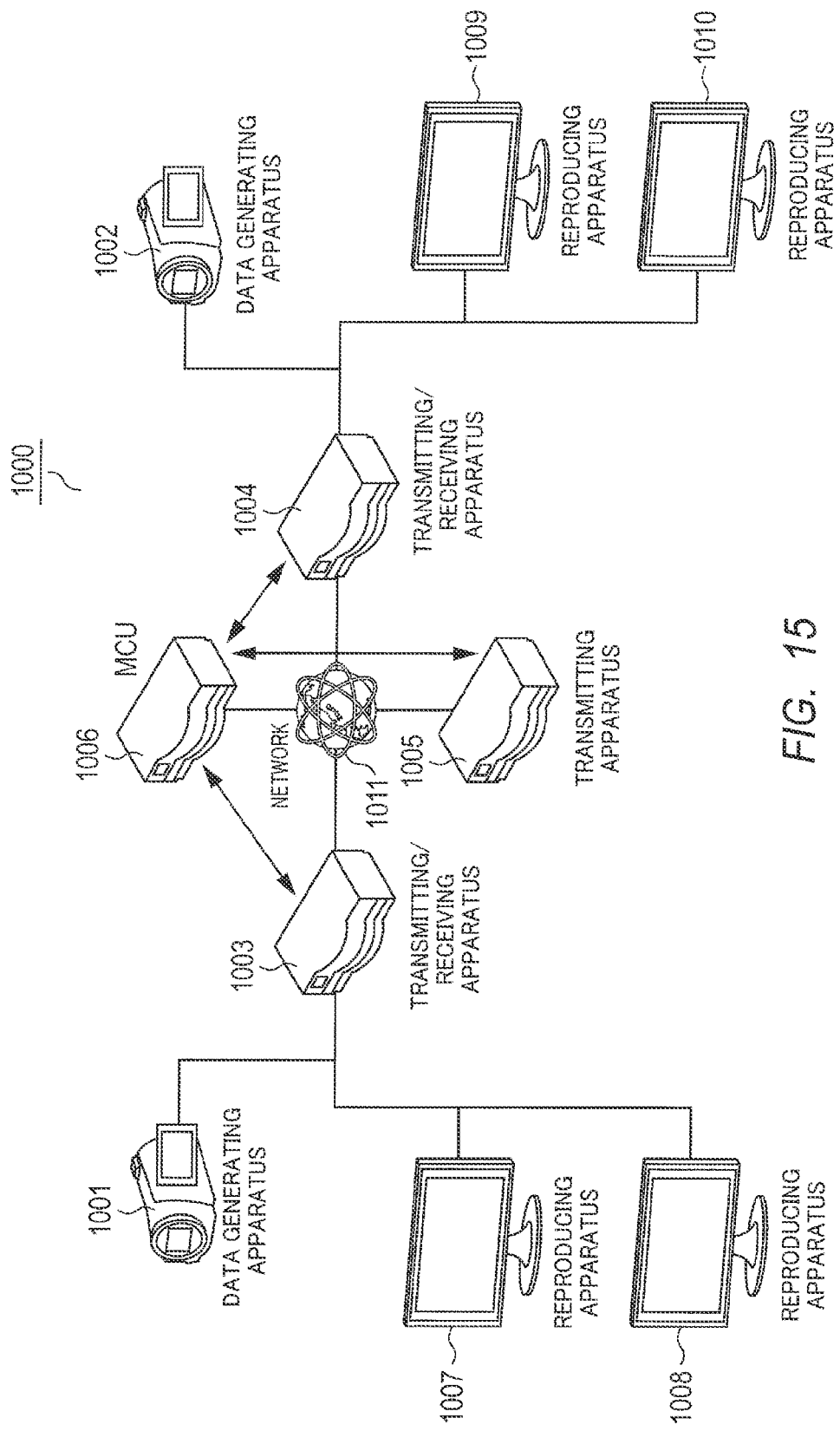
FIG. 15 illustrates an example of a configuration of a communication system according to Embodiment 3 of the present invention.

Embodiment 3 will describe a case where the present invention is applied to a multi-point transmission apparatus (MCU: multi-point control unit) capable of handling a plurality of real-time streams. FIG. 15 illustrates an example of a configuration of a communication system according to the present embodiment.

Data generating apparatus 1001 converts to data, an image of a first spectator picked up by a camera and sound of the first spectator collected by a microphone, generates real-time streams of the image and/or sound data and outputs the real-time streams to transmitting/receiving apparatus 1003. Data generating apparatus 1002 converts to data, an image of a second spectator picked up by a camera and sound of the second spectator collected by a microphone, generates real-time streams of the image and/or sound data and outputs the real-time streams to transmitting/receiving apparatus 1004.

Transmitting/receiving apparatus 1003 encodes the real-time streams outputted from data generating apparatus 1001 to configure a packet and transmits the packet to MCU 1006 via network 1011. Furthermore, transmitting/receiving apparatus 1003 decodes a packet received from MCU 1006 and outputs a real-time stream of an image and/or sound to reproducing apparatuses 1007 and 1008.

Transmitting/receiving apparatus 1004 encodes the real-time streams outputted from data generating apparatus 1002 to configure a packet and transmits the packet to MCU 1006 via network 1011. Furthermore, transmitting/receiving apparatus 1004 decodes a packet received from MCU 1006 and outputs a real-time stream of an image and/or sound to reproducing apparatuses 1009 and 1010.

Transmitting apparatus 1005 converts, for example, an image and/or sound of a soccer game to data, generates real-time streams of the image and/or sound data and transmits the image and/or sound data to MCU 1006 via network 1011.

MCU 1006 decodes the packets received from transmitting/receiving apparatus 1003, transmitting/receiving apparatus 1004 and transmitting apparatus 1005, and combines the image data of the first spectator and the second spectator so as to be displayed on divided screens. MCU 1006 re-encodes the real-time streams of the combined image data to configure a packet. MCU 1006 then transmits the re-encoded packet to transmitting/receiving apparatus 1003 and transmitting/receiving apparatus 1004 via network 1011.

Reproducing apparatuses 1007 and 1009 respectively reproduce the image and/or sound based on a real-time stream of the image obtained by combining the images of the first spectator and the second spectator on divided screens and a real-time stream of sound of the first spectator and the second spectator. Reproducing apparatuses 1008 and 1010 respectively reproduce the image and/or sound based on a real-time stream of the image and/or sound of the soccer game.

Thus, communication system 1000 combines images and sound of a plurality of spectators in MCU 1006 while sharing the images and sound of a game to be watched (soccer game) at a plurality of points and re-delivers the combined image and sound. This allows communication system 1000 to deliver both images and/or sound among spectators and images and/or sound of the game to be watched via network 1011.

In this system configuration, the configuration requirements of transmitting apparatus 103 described in Embodiment 1 are introduced to MCU 1006. The configuration requirements of receiving apparatus 104 described in Embodiment 1 are introduced to transmitting/receiving apparatuses 1003 and 1004.

The quality control information storage section of MCU 1006 stores quality control information set by the user as shown in FIG. 16. In the example in FIG. 16, weak protection is set (St=2) for images (divided screens) among spectators and slightly strong protection is set (St=5) for sound (Mix sound) among spectators. Strongest protection is set (St=10) for images of a game to be watched (soccer images), sound (soccer sound). Synchronization parameters of images (divided screens) and sound (Mix sound) among spectators are set (Syt=10 ms) so as to allow for minor synchronization differences. Images (divided screens) among spectators and images (soccer images) and sound (soccer sound) of a game to be watched are set (Syt=200 ms) so as to allow for minor synchronization differences.

FIG. 17 illustrates effects of Embodiment 1 of the present invention. FIG. 17 shows protection effects 1207 when redundancy code strength 1205 and retransmission upper limit count 1206 are adopted for each of real-time streams 1201 to 1204.

In the present embodiment, as shown in FIG. 17, since images (soccer images) and sound (soccer sound) of the game to be watched are strongly protected, these real-time streams are transmitted completely undisturbed.

Images (divided screens) and sound (Mix sound) among spectators are reproduced with a degree of delay difference that would not cause any uncomfortable feeling. Therefore, the present embodiment reduces redundancy codes for protecting images (divided screens) among spectators, and can thereby assign more resources (bands) to information on images and sound of a more important game to be watched.

When transmitting information via a best-effort network such as the Internet, the present embodiment eliminates uncomfortable feeling caused by a difference between a game to be watched and cheers. Moreover, the present embodiment allows reaction among spectators to be shared while more strongly protecting a more important game to be watched.

A transmitting apparatus of the embodiments is a transmitting apparatus that multiplexes and transmits a plurality of real-time streams to a receiving apparatus via a network where a packet loss occurs, the transmitting apparatus including: a quality control information storage section that stores quality control information set by a user for controlling transmission quality of each real-time stream; a recovery strength indicating section that sets redundancy code strength for each of the plurality of real-time streams in accordance with transmission quality information indicating a situation of the network and the quality control information; and a redundant coding section that determines a redundant code amount of each of the real-time streams based on the redundancy code strength, and that generates a redundancy code packet.

The transmitting apparatus of the embodiments further includes: a delay amount indicating section that sets a retransmission upper limit count for each of the plurality of real-time streams in accordance with the transmission quality information and the quality control information; and a retransmission control section that retransmits a packet of each of the real-time streams until the retransmission upper limit count according to a retransmission request from the receiving apparatus.

In the transmitting apparatus of the embodiments, the quality control information includes at least one of protection strength of the real-time stream, a type of the real-time stream, priority of the real-time stream and a degree of relatedness between the real-time streams.

A receiving apparatus of the embodiments is a receiving apparatus that receives a plurality of multiplexed real-time streams from a transmitting apparatus via a network where a packet loss occurs, the receiving apparatus including: a receiving section that receives, from the transmitting apparatus, redundancy code strength set in accordance with transmission quality information indicating a situation of the network and quality control information set by a user for controlling transmission quality of each real-time stream; a redundancy code decoding section that stores a packet of each of the real-time streams based on the redundancy code strength, and that executes processing of recovering a packet lost in the network, using a redundancy code packet; and a transmission quality information generating section that generates the transmission quality information, and that transmits the information to the transmitting apparatus.

In the receiving apparatus of the embodiments, the receiving section receives a retransmission upper limit count set by the transmitting apparatus in accordance with the transmission quality information and the quality control information, and the receiving apparatus further includes: a storage period indicating section that sets a time for storing a packet based on the retransmission upper limit count; and a buffer section that stores a packet of a real-time stream transmitted from the transmitting apparatus for the set time, and that transmits, when a packet loss occurs, a retransmission request to the transmitting apparatus until the retransmission upper limit count.

A receiving apparatus of the embodiments is a receiving apparatus that receives a plurality of multiplexed real-time streams from a transmitting apparatus via a network where a packet loss occurs, the receiving apparatus including: a quality control information storage section that stores quality control information set by a user for controlling transmission quality of each real-time stream; a transmission quality information generating section that generates transmission quality information indicating a situation of the network; a recovery strength indicating section that sets redundancy code strength for each of the plurality of real-time streams in accordance with the transmission quality information and the quality control information, and that transmits the redundancy code strength to the transmitting apparatus; and a redundancy code decoding section that stores a packet of each of the real-time streams based on the redundancy code strength, and that executes processing of recovering a packet lost in the network, using a redundancy code packet.

The receiving apparatus of the embodiments, further includes: a delay amount indicating section that sets a retransmission upper limit count for each of the plurality of real-time streams in accordance with the transmission quality information and the quality control information, and that transmits the retransmission upper limit count to the transmitting apparatus; a storage period indicating section that sets a time for storing a packet based on the retransmission upper limit count; and a buffer section that stores a packet of a real-time stream transmitted from the transmitting apparatus for the time indicated by the storage period indicating section, and that transmits, when a packet loss occurs, a retransmission request to the transmitting apparatus until the retransmission upper limit count.

In the receiving apparatus of the embodiments, the quality control information includes at least one of protection strength of the real-time stream, a type of the real-time stream, priority of the real-time stream and a degree of relatedness between the real-time streams.

A transmitting apparatus of the embodiments is a transmitting apparatus that multiplexes and transmits a plurality of real-time streams to a receiving apparatus via a network where a packet loss occurs, the transmitting apparatus including: a receiving section that receives redundancy code strength set by the receiving apparatus in accordance with transmission quality information indicating a situation of the network and quality control information set by a user for controlling transmission quality of each real-time stream; and a redundant coding section that determines a redundant code amount of each of the real-time streams based on the redundancy code strength, and that generates a redundancy code packet.

In the receiving apparatus of the embodiments, the receiving section receives a retransmission upper limit count set by the receiving apparatus in accordance with the transmission quality information and the quality control information, and the receiving apparatus further includes a retransmission control section that retransmits a packet of each of the real-time streams according to a retransmission request from the receiving apparatus until the retransmission upper limit count.

In the above embodiments, the synchronization parameter and protection strength have been described as examples of quality control information, but the present invention is not limited to this. The above embodiments can also use other information such as the type of real-time stream, priority of real-time stream, complexity of real-time stream, degree of relatedness among real-time streams.

The disclosure of the specification, drawings, and abstract in Japanese Patent Application No. 2012-127319 filed on Jun. 4, 2012 is incorporated herein by reference in its entirety.

INDUSTRIAL APPLICABILITY

The present invention is suitable for use in a transmitting apparatus of a system which transmits a plurality of real-time streams via a best-effort network such as the Internet.

REFERENCE SIGNS LIST

101, 102, 1001, 1002 Data generating apparatus
103, 803, 1005 Transmitting apparatus
104, 804 Receiving apparatus
105, 106, 1007, 1008, 1009, 1010 Reproducing apparatus
201, 202 Coding section
203, 903 Quality control information storage section
204, 904 Recovery strength indicating section
205, 206 Redundant coding section
207, 907 Delay amount indicating section
208, 209 Retransmission control section
210 Multiplexing section
211, 301 Radio section
302 Demultiplexing section
303, 304 Storage period indicating section
305, 306 Buffer section
307, 308 Redundancy code decoding section
309, 310 Decoding section
311 Transmission quality information generating section
1003, 1004 Transmitting/receiving apparatus
1006 MCU

The invention claimed is:

1. A transmitting apparatus that multiplexes and transmits a plurality of real-time streams to a receiving apparatus via a network where a packet loss occurs, the transmitting apparatus comprising:
    a quality control information storage section that stores quality control information set by a user for controlling transmission quality of each real-time stream;
    a recovery strength indicating section that sets redundancy code strength for each of the plurality of real-time streams in accordance with transmission quality information indicating a situation of the network and the quality control information; and
    a redundant coding section that determines a redundant code amount of each of the real-time streams based on the redundancy code strength, and that generates a redundancy code packet.

2. The transmitting apparatus according to claim 1, further comprising:
    a delay amount indicating section that sets a retransmission upper limit count for each of the plurality of real-time streams in accordance with the transmission quality information and the quality control information; and
    a retransmission control section that retransmits a packet of each of the real-time streams until the retransmission upper limit count according to a retransmission request from the receiving apparatus.

3. The transmitting apparatus according to claim 1, wherein the quality control information comprises at least one of protection strength of the real-time stream, a type of the real-time stream, priority of the real-time stream and a degree of relatedness between the real-time streams.

4. A receiving apparatus that receives a plurality of multiplexed real-time streams from a transmitting apparatus via a network where a packet loss occurs, the receiving apparatus comprising:
    a receiving section that receives, from the transmitting apparatus, redundancy code strength set in accordance with transmission quality information indicating a situation of the network and quality control information set by a user for controlling transmission quality of each real-time stream;
    a redundancy code decoding section that stores a packet of each of the real-time streams based on the redundancy code strength, and that executes processing of recovering a packet lost in the network, using a redundancy code packet; and
    a transmission quality information generating section that generates the transmission quality information, and that transmits the information to the transmitting apparatus.

5. The receiving apparatus according to claim 4, wherein the receiving section receives a retransmission upper limit count set by the transmitting apparatus in accordance with the transmission quality information and the quality control information, and
    the receiving apparatus further comprises:
    a storage period indicating section that sets a time for storing a packet based on the retransmission upper limit count; and
    a buffer section that stores a packet of a real-time stream transmitted from the transmitting apparatus for the set time, and that transmits, when a packet loss occurs, a retransmission request to the transmitting apparatus until the retransmission upper limit count.

6. A transmission method for a transmitting apparatus that multiplexes and transmits a plurality of real-time streams to a receiving apparatus via a network where a packet loss occurs, the method comprising:

storing quality control information set by a user for controlling transmission quality of each real-time stream;

setting redundancy code strength for each of the plurality of real-time streams in accordance with transmission quality information indicating a situation of the network and the quality control information; and determining a redundant code amount of each of the real-time streams based on the redundancy code strength, and generating a redundancy code packet.

7. The transmission method according to claim 6, further comprising:

setting a retransmission upper limit count for each of the plurality of real-time streams in accordance with the transmission quality information and the quality control information; and retransmitting a packet of each of the real-time streams according to a retransmission request from the receiving apparatus until the retransmission upper limit count.

\* \* \* \* \*